United States Patent
Pande et al.

(10) Patent No.: US 12,442,031 B1
(45) Date of Patent: Oct. 14, 2025

(54) DNA LABELING COMPOSITIONS AND METHODS FOR COMPARATIVE GENOMIC HYBRIDIZATION

(71) Applicant: Enzo Biochem, Inc., New York, NY (US)

(72) Inventors: Praveen Pande, Holbrook, NY (US); Jack Coleman, East Northport, NY (US); Christian Merz, Hicksville, NY (US)

(73) Assignee: Enzo Biochem, Inc., Farmingdale, NY (US)

( * ) Notice: Subject to any disclaimer, the term of this patent is extended or adjusted under 35 U.S.C. 154(b) by 516 days.

(21) Appl. No.: 16/010,999

(22) Filed: Jun. 18, 2018

Related U.S. Application Data (60) Provisional application No. 62/510,997, filed on May 25, 2017.

(51) Int. Cl.
| | | |
|---|---|---|
| *C12Q 1/68* | (2018.01) | |
| *C12Q 1/6806* | (2018.01) | |
| *C12Q 1/6813* | (2018.01) | |
| *C12Q 1/6876* | (2018.01) | |
| *C40B 50/04* | (2006.01) | |

(52) U.S. Cl.
CPC ......... *C12Q 1/6806* (2013.01); *C12Q 1/6813* (2013.01); *C12Q 1/6876* (2013.01); *C12Q 2523/10* (2013.01); *C12Q 2533/101* (2013.01); *C12Q 2563/107* (2013.01); *C40B 50/04* (2013.01)

(58) Field of Classification Search
None
See application file for complete search history.

(56) References Cited

U.S. PATENT DOCUMENTS

| | | | | |
|---|---|---|---|---|
| 2008/0070241 | A1* | 3/2008 | Rabbani | C12Q 1/6844 |
| | | | | 435/6.12 |
| 2010/0055680 | A1* | 3/2010 | Shi | C12Q 1/6846 |
| | | | | 435/6.16 |

OTHER PUBLICATIONS

Veltman, JA. et al. High-throughput analysis of subtelomeric chromosome rearrangements by use of array-based comparative genomic hybridization. Am J Hum Genet., vol. 70, p. 1269-1276, 2002.*

Bond U, et al. Aneuploidy and copy number breakpoints in the genome of larger yeasts mapped by microarray hybridization. Curr Gnet., vol. 45, p. 360-370, 2004.*

Kimmel, R., et al. Preparation of genomic DNA for microarray-based comparative genome hybridization. Reviews and Protocols in DT40 Research, pp. 363-371, 2006.*

Al-Shamali , M., et al. A multiplex polymerase chain reaction assay for the detection of *Mycobacterium paratuberculosis* DNA in Crohn's disease tissue.Scandinavian J Gastroenterology, Vo. 32 (8), p. 819-823, 1997.*

Lee et al. An isothermal method for whole genome amplification of fresh and degraded DNA for comparative genome hybridization, genotyping and mutation detection. DNA Research, vol. 13, p. 77-88, 2006.*

Veltman, JA., et al. High-throughput analysis of subtelomeric chromosome rearrangements by use of array-based comparative genomic hybridization. Am. J. Hum. Genetics, vol. 70, p. 1269-1276, (2002).*

\* cited by examiner

*Primary Examiner* — Suryaprabha Chunduru
(74) *Attorney, Agent, or Firm* — Quarles & Brady LLP (57) ABSTRACT

The invention provides compositions and methods for preparing high-quality labeled DNA for use in array-based comparative genomic hybridization in amounts sufficient therefor starting with a low amount of input genomic DNA, such as 50-250 nanograms input genomic DNA.

12 Claims, 9 Drawing Sheets

DNA LABELING COMPOSITIONS AND METHODS FOR COMPARATIVE GENOMIC HYBRIDIZATION

CROSS-REFERENCE TO RELATED APPLICATIONS

This application claims the benefit of U.S. provisional patent application Ser. No. 62/510,997 filed May 25, 2017 which is hereby incorporated by reference in its entirety.

FIELD OF THE INVENTION

The present invention relates to the field of comparative genomic hybridization (CGH).

BACKGROUND OF THE INVENTION

Array-based comparative genomic hybridization (aCGH) is a powerful tool for detecting gene copy number gains and losses associated with chromosomal abnormalities. Detecting chromosomal aberrations by aCGH is faster, more robust and provides superior results over other technologies such as FISH and G-banding karyotyping, thus providing a greater understanding of the role of chromosomal changes in genetic diseases and cancers. Nick translation or randomly primed DNA extension may be used to provide labeled DNA for aCGH.

What is needed and provided by the present invention are improved compositions and methods for preparing high-quality labeled DNA for aCGH in amounts sufficient therefor starting with a low amount of input DNA, such as 50-250 nanograms input DNA.

SUMMARY OF THE INVENTION

One embodiment of the invention provides an improved method for preparing fluorescently labeled output DNA suitable for array-based comparative genomic hybridization from input genomic DNA, including the steps of:
  providing a sample of genomic DNA, such as mammalian genomic DNA, for example, in the amount of 50-1,000 nanograms, such as in the amount of 50-250 nanograms;
  admixing the sample of genomic DNA with random DNA primers such as random DNA octamers in a reaction buffer including magnesium such as $MgCl_2$,
    wherein the admixture at least substantially does not contain any (such as almost none or none at all) metal chelating compounds such as EDTA or EGTA;
  heating the admixture to denature the genomic DNA and then cooling the admixture to permit the random DNA primers to anneal to the genomic DNA in the admixture;
  further admixing (one by one or together in any combination) to form a primer extension composition
    a DNA-dependent DNA polymerase, such as a Klenow fragment,
    dATP,
    dGTP,
    dCTP,
    dTTP, and
    fluorescently labeled dUTP; and
  incubating the primer extension composition for a period of time, such as but not limited to 2-hours, at a temperature permissive for primer extension, such as 37° C.±10%, to extend the random DNA primers on the genomic DNA, thereby forming fluorescently labeled DNA extension products. In one variation, EDTA is also provided and admixed in the further admixing step. In another variation, neither EDTA nor EGTA is provided and admixed in the further admixing step. In a related variation, no metal chelating agents are provided and admixed in the further admixing step.

The method may include the further steps of stopping the primer extension and purifying the DNA present to obtain purified DNA including the fluorescently labeled DNA extension products. The method may include the still further step of hybridizing the purified DNA including the fluorescently labeled DNA extension products to a CGH array.

The concentrations of labeled and unlabeled nucleotides (dNTPs; deoxyribonucleoside triphosphates) and EDTA in the primer extension composition may, for example, be:
  0.4 mM±20% dATP;
  0.4 mM±20% dCTP;
  0.4 mM±20% dGTP;
  0.4 mM±20% dTTP;
  0.08 mM±20% to 0.16 mM±20% fluorescently labeled dUTP; and
  1.2 mM±20% EDTA.

In one variation, the fluorescently labeled dUTP is Cyanine-3-dUTP and its concentration in the primer extension composition is 0.16 mM±20%. In another variation, the fluorescently labeled dUTP is Cyanine-5-dUTP and its concentration in the primer extension composition is 0.08 mM±20%. In a further variation, there is no EDTA or EGTA in the primer extension composition. In a related further variation, there is no metal chelating agent in the primer extension composition.

The invention also provides kit embodiments and subcomponent composition embodiments thereof for performing the methods of the invention.

Additional features, advantages, and embodiments of the invention may be set forth or apparent from consideration of the following detailed description, drawings if any, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

with 10 ng DNA input; (panel B) with 25 ng DNA input; (panel C) with 50 ng DNA input and (panel D) with 1000 ng DNA input.

DETAILED DESCRIPTION OF THE INVENTION

The present invention provides compositions and methods for preparing high quality labeled DNA for aCGH in amounts sufficient therefor starting with a low amount of input DNA, such as less than or equal to 1,000 nanograms, e.g., in the range of 50-1,000 nanograms, or such as less than or equal to 250 nanograms input DNA, for example in the range of 50-250 nanograms input DNA. Input DNA may, for example, be male or female mammalian genomic DNA, such as but not limited to human genomic DNA.

Usable DNA Input Range for High-Quality Output DNA for aCGH:

CGH DNA Labeling Kit (ENZ-42674-K010/K100, existing products)=250 ng to 2500 ng usable range input DNA to obtain high-quality output (labeled DNA) in sufficient quantity for CGH array hybridization. This product is used for CGH-only and CGH+SNP array assays.

SuperCGH (embodiments of the present invention)=50 ng to 1000 ng usable range input DNA to obtain high-quality output (labeled DNA) in sufficient quantity for array hybridization.

Kit Components:
ENZO CGH Kit (ENZ-42674-K010 and -K100, Existing Products):
Labeling Components (Store at −20° C.):

| Reagent | Vial ID | Min. Volume Supplied ENZ-42674-K010 | ENZ-42674-K100 |
|---|---|---|---|
| Primers/Reaction Buffer | 1 | 400 µL | 4 mL |
| Cyanine-3 dUTP Nucleotide Mix | 2 | 2 × 50 µL | 1 mL |
| Cyanine-5 dUTP Nucleotide Mix | 3 | 2 × 50 µL | 1 mL |
| Klenow DNA Polymerase | 4 | 20 µL | 200 µL |
| Stop Buffer | 5 | 100 µL | 1 mL |
| Nuclease-free Water | W | 1 mL | 10 mL |

All ENZ product numbers refer to products of Enzo Life Sciences, Inc. (Farmingdale, NY).
SuperCGH Kit (an Embodiment of the Present Invention):
Labeling Components (Store at −20° C.):

| Reagent | Vial ID | Min. Volume Supplied SuperCGH low volume kit embodiment | SuperCGH high volume kit embodiment |
|---|---|---|---|
| DNA Primers/Reaction Buffer | 1 | 400 µL | 4 mL |
| Super Cyanine 3 Nucleotide Mix | 2 | 100 µL | 1 mL |
| Super Cyanine 5 Nucleotide Mix | 3 | 100 µL | 1 mL |
| Klenow DNA Polymerase | 4 | 20 µL | 200 µL |
| Stop Buffer | 5 | 100 µL | 1.0 mL |
| Nuclease-free Water | W | 1 ml | 10 mL |

SuperCGH Cyanine-3-Nucleotide Mix Formulation:

| Component | Concentration |
|---|---|
| dATP | 2 mM |
| dCTP | 2 mM |
| dGTP | 2 mM |
| dTTP | 1 mM |
| Cyanine-3-dUTP | 0.8 mM |
| EDTA | 6 mM |

SuperCGH Cyanine-5-Nucleotide Mix Formulation:

| Component | Concentration |
|---|---|
| dATP | 2 mM |
| dCTP | 2 mM |
| dGTP | 2 mM |
| dTTP | 1 mM |
| Cyanine-5-dUTP | 0.4 mM |
| EDTA | 6 mM |

In related embodiments of the aforementioned nucleotide mix formulations, there is no EDTA and no EGTA in the formulation. For example, there may be no metal chelating agents in said formulations.

SuperCGH Kit Embodiment Composed of Component Embodiments 1-6

1) Primer/Reaction Buffer (Vial 1)
   125 mM Tris-HCl, pH 7.8, 12.5 mM $MgCl_2$, 25 mM βME,
   750 µg/ml Random DNA Octamers
2) Super Cyanine-3 dUTP Nucleotide Mix (Vial 2)
   2 mM dATP, 2 mM dCTP, 2 mM dGTP, 1 mM dTTP, 0.8 mM Cyanine-3-dUTP with 6 mM EDTA
3) Super Cyanine-5 dUTP Nucleotide Mix (Vial 3)
   2 mM dATP, 2 mM dCTP, 2 mM dGTP, 1 mM dTTP, 0.4 mM Cyanine-5-dUTP with 6 mM EDTA
4) Klenow DNA Polymerase (Vial 4)
   Klenow Fragment (3'-5' exo-) 50 U/µl
5) Stop Buffer (Vial 5)
   0.2M EDTA, pH 8.0
6) Water (Vial W)
   Nuclease-free Water The primer reaction buffer contains magnesium ($MgCl_2$) and does not contain EDTA or any other chelator, while the nucleotide mixes do contain EDTA in this embodiment. However, the invention also provides a related embodiment in which the nucleotide mixes do not contain EDTA and do not contain EGTA. In a related variation, the nucleotide mixes do not contain a metal chelating agent. The following metal chelator-free nucleotide mix composition embodiments are also provided by the invention: (1) metal chelator-free Cyanine-3 dUTP nucleotide mix: 2.0 mM dATP, 2.0 mM dCTP, 2.0 mM dGTP, 1.25 mM dTTP, 1.0 mM Cyanine-3 dUTP; and (2) metal chelator-free Cyanine-5 dUTP nucleotide mix: 2.0 mM dATP, 2.0 mM dCTP, 2.0 mM dGTP, 1.0 mM dTTP, 0.5 mM Cyanine-5 dUTP. Metal chelator-free nucleotide mix compositions may be used in place of chelator-containing nucleotide mix compositions in any of the embodiments of the invention.

The invention also provides related embodiments of any of the embodiments of kit, component, mixture or composition described herein in which any chemical component quantity is in the range of +/−25%, +/−20%, +/−15%, +/−10% or +/−5% of the recited numerical value for the chemical component. Similarly, the invention also provides related embodiments of any of the aforementioned embodiments of kit, component, mixture or composition in which any chemical component quantity is in the range of the within-stated numerical value for the chemical component up to and including +25%, +20%, +15%, +10%, or +5% of said numerical value.

Various aspects and embodiments of the invention are illustrated in the accompanying drawings, as further described below.

Figure 1:
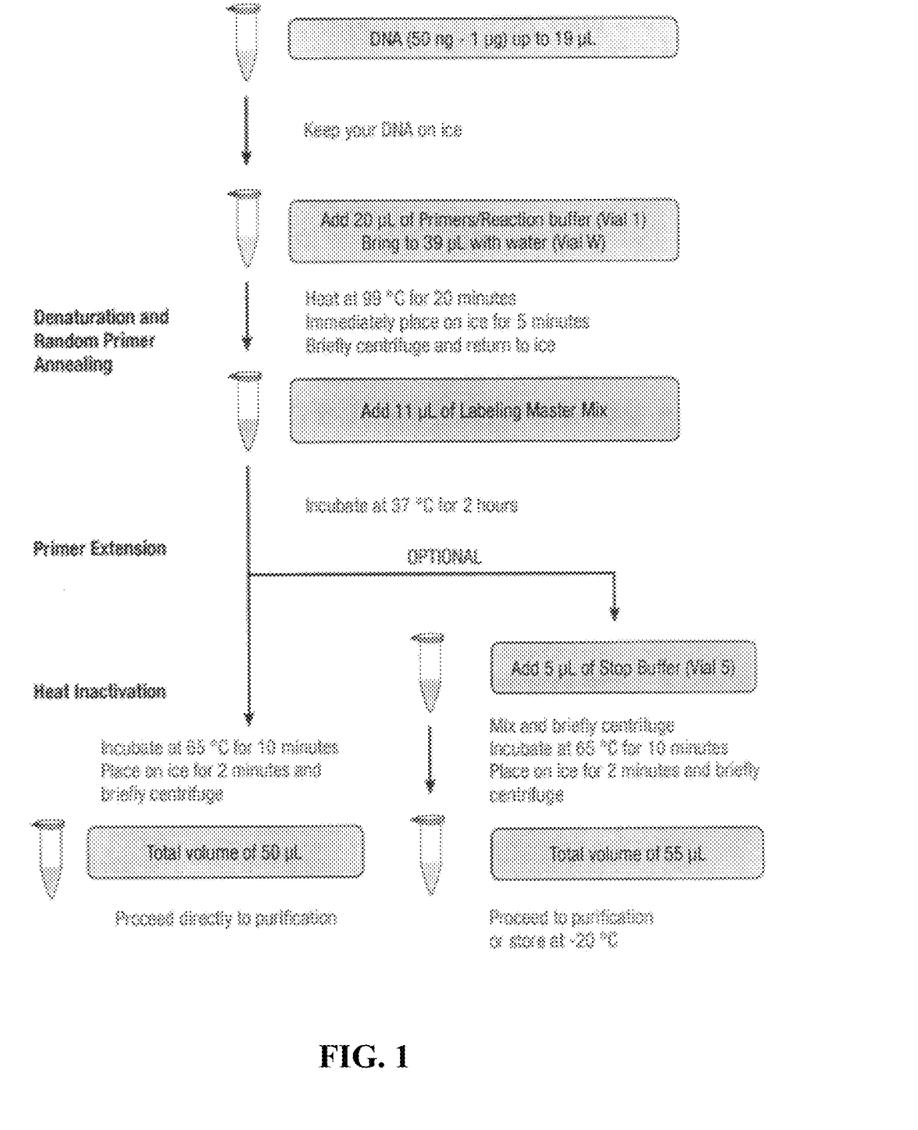
FIG. 1 shows a process embodiment for genomic DNA labeling on hybridization on a 4×180 CGH array.

FIG. 1 shows a process embodiment for genomic DNA labeling on hybridization on a 4×180 CGH array. Notably, the primer reaction buffer contains magnesium (MgCl$_2$) and does not contain EDTA or any other chelator, while the nucleotide mixes do contain EDTA. The advantageous results obtained with the present invention, namely the ability to use input genomic DNA in the range of 50-250 ng are seen when EDTA is included in the nucleotide mix(es) but not when EDTA is included in the primer reaction buffer. Further advantageously, the use of EDTA in the nucleotide mix but not in the primer reaction buffer allows high-quality labeled output DNA, in sufficient quantity for aCGH, to be obtained with a 2-hour incubation (reaction) time at 37° C.

Further, in the embodiment, the "Labeling Master Mix" is a mixture of 10 µL of one of the nucleotide mixes plus 1 µL of the Klenow fragment (polymerase) 50 U/µL. Accordingly, in the total reaction volume of 50 µL, the concentration of the components of the nucleotide mix is diluted 5-times. Thus, for the Cyanine-3 dUTP nucleotide mix, the final concentrations are: 0.4 mM dATP, 0.4 mM dCTP, 0.4 mM dGTP, 0.2 mM dTTP, 0.16 mM Cyanine-3-dUTP and 1.2 mM EDTA. And for the Cyanine-5 dUTP mix, the final concentrations are: 0.4 mM dATP, 0.4 mM dCTP, 0.4 mM dGTP, 0.2 mM dTTP, 0.08 mM Cyanine-5-dUTP and 1.2 mM EDTA.

For any component/components of any embodiment of the invention, their concentration in the primer extension reaction may also be in the range of +/−25%, +/−20%, +/−15%, +/−10% or +/−5% of the exemplified concentration. Similarly, for any component/components of any embodiment of the invention, their concentration in the primer extension reaction may, for example, also be in the range of the exemplified concentration of the component up to and including +25%, +20%, +15%, +10%, or +5% of exemplified concentration.

The Cyanine-5 dUTP (ENZ-42502) and the Cyanine-3 dUTP are labeled on the 5-position of the nucleotide triphosphate. Other fluorescently labeled nucleotide triphosphates, such as dUTPs, may also be used, for example, dUTPs fluorescently labeled at the 5-position with fluorophore compounds other than Cyanine-3 and Cyanine-5, such as those known in the art.

Figure 2A:
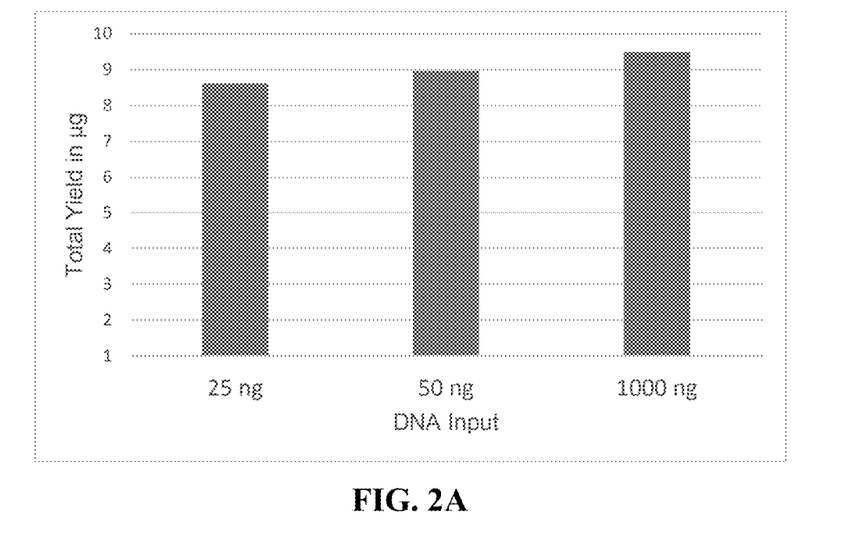
FIGS. 2A and 2B show the total yield of labeled DNA obtained using various inputs (FIG. 2A) and total pmols of Cyanine 3 labeled on the DNA (FIG. 2B).
Figure 2B:
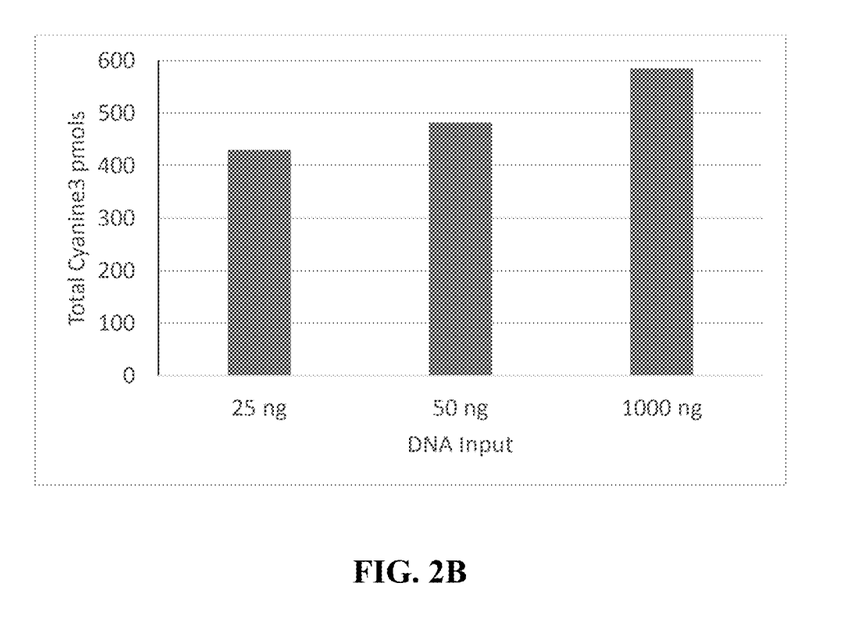

FIGS. 2A and 2B shows the total yield of labeled DNA obtained using various inputs (FIG. 2A) and total pmols of Cyanine 3 labeled on the DNA (FIG. 2B).

Figure 3A:
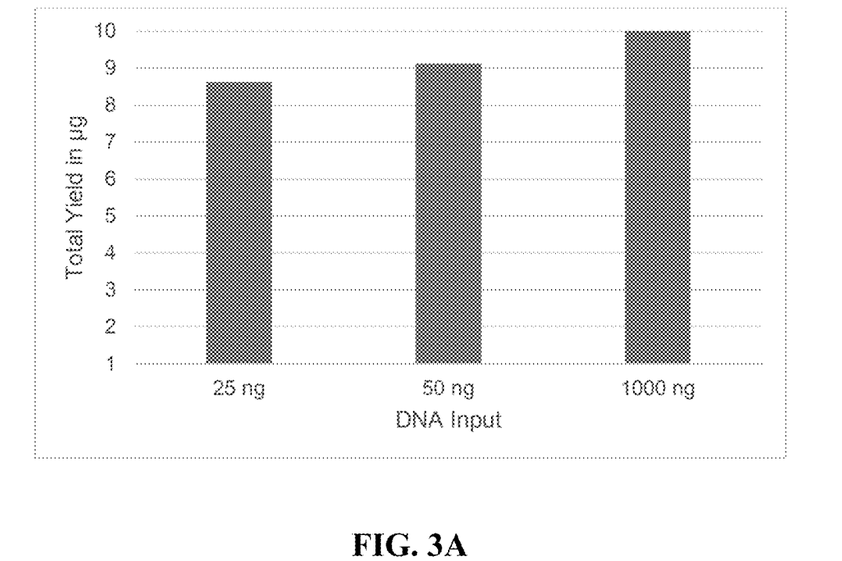
FIGS. 3A and 3B show the total yield of labeled DNA obtained using various inputs (FIG. 3A) and total pmols of Cyanine 5 labeled on the DNA (FIG. 3B).
Figure 3B:
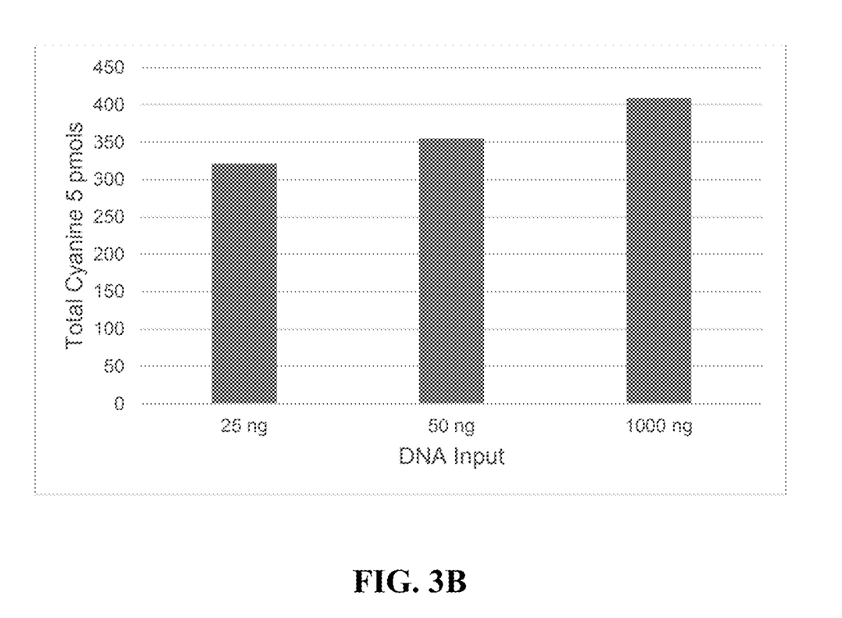

FIGS. 3A and 2B shows the total yield of labeled DNA obtained using various inputs (FIG. 3A) and total pmols of Cyanine 5 labeled on the DNA (FIG. 3B).

Figure 4A:
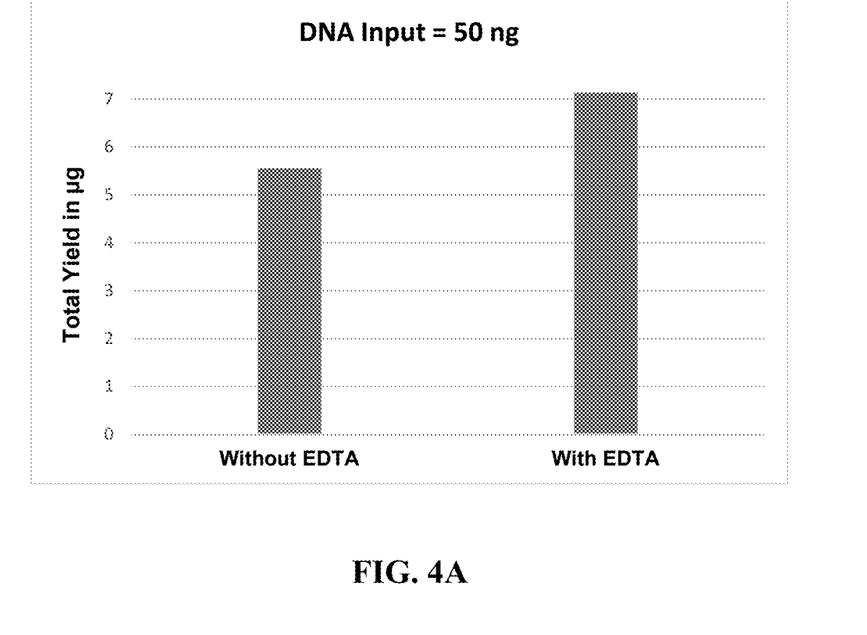
FIGS. 4A and 4B show the effect of EDTA in the nucleotide mix. The total yield increased by 22% (FIG. 4A) and total dye pmols by 30% (FIG. 4B) in the presence of EDTA.
Figure 4B:
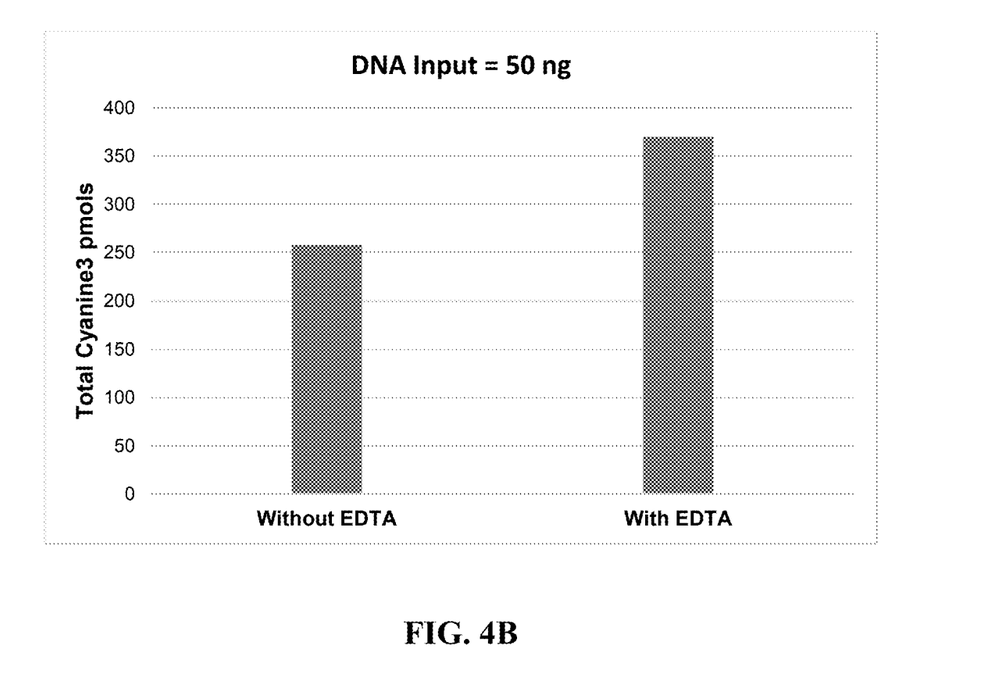

FIGS. 4A and 4B shows the effect of EDTA in the nucleotide mix. The total yield increased by 22% (FIG. 4A) and total dye pmols by 30% (FIG. 4B) in the presence of EDTA.

Figure 5:
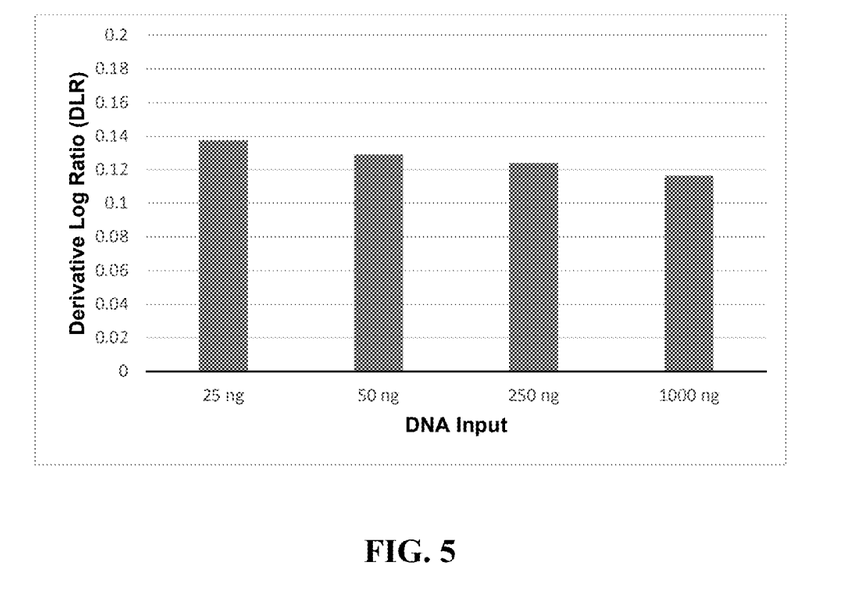
FIG. 5 shows low Derivative Log Ration (DLR) scores obtained with high quality genomic DNA at various inputs on a 4×180 array
Figure 6:
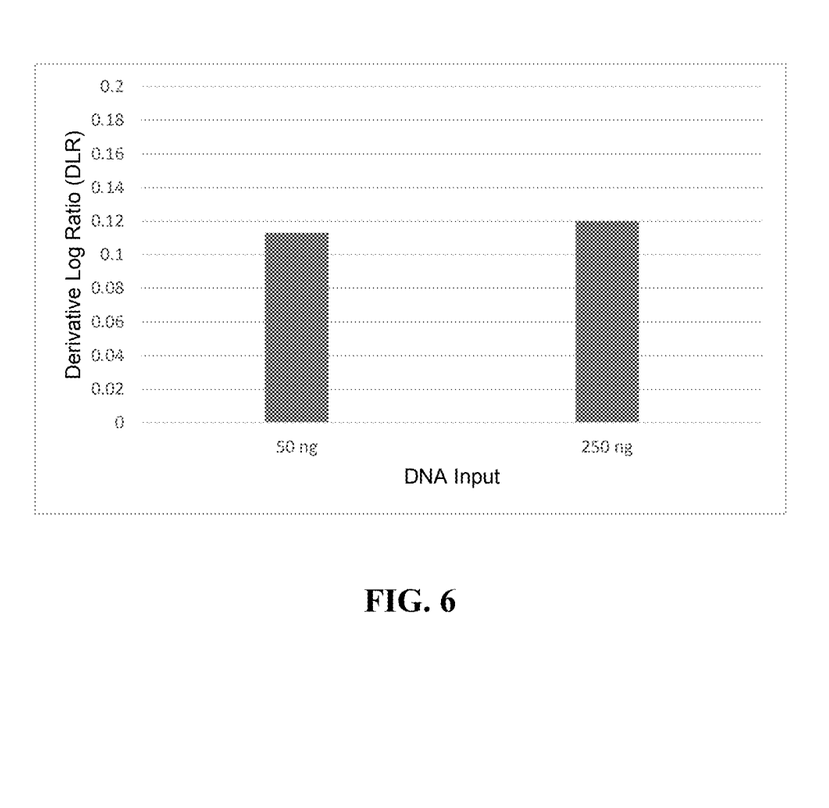
FIG. 6 shows low DLR scores obtained with high quality genomic DNA at different inputs on a 8×60 array FIG. 7 panels A-D show the analysis of syndromic DNA using an oligonucleotide microarray (Agilent 4×180K) that clearly demonstrated the characteristic deletion in 15q11.2-q13 (chromosome 15) using Prader-Willi DNA, (panel A)
Figure 7:
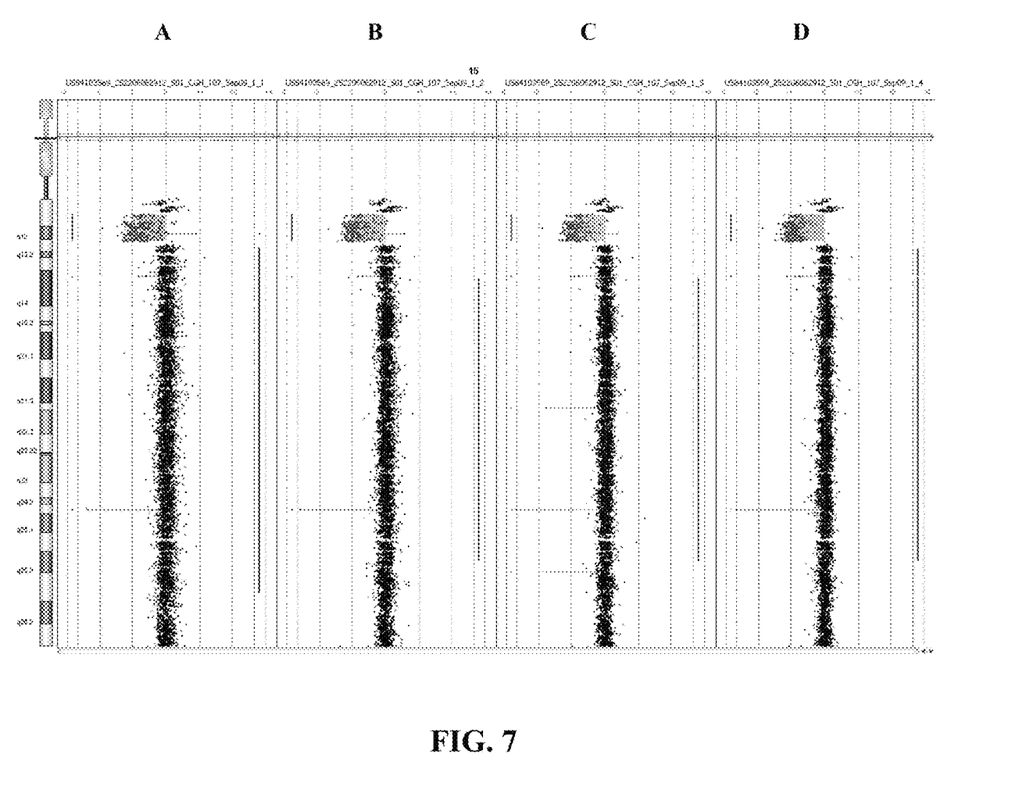

FIG. 5 shows low Derivative Log Ratio (DLR) scores obtained with high quality genomic DNA at various inputs on a 4×180 array FIG. 6 shows low DLR scores obtained with high quality genomic DNA at different inputs on a 8×60 array FIG. 7 panels A-D show the analysis of syndromic DNA using an oligonucleotide microarray (Agilent 4×180K) that clearly demonstrated the characteristic deletion in 15q11.2-q13 (chromosome 15) using Prader-Willi DNA, (panel A) with 10 ng DNA input; (panel B) with 25 ng DNA input; (panel C) with 50 ng DNA input and (panel D) with 1000 ng DNA input.

Figure 8:
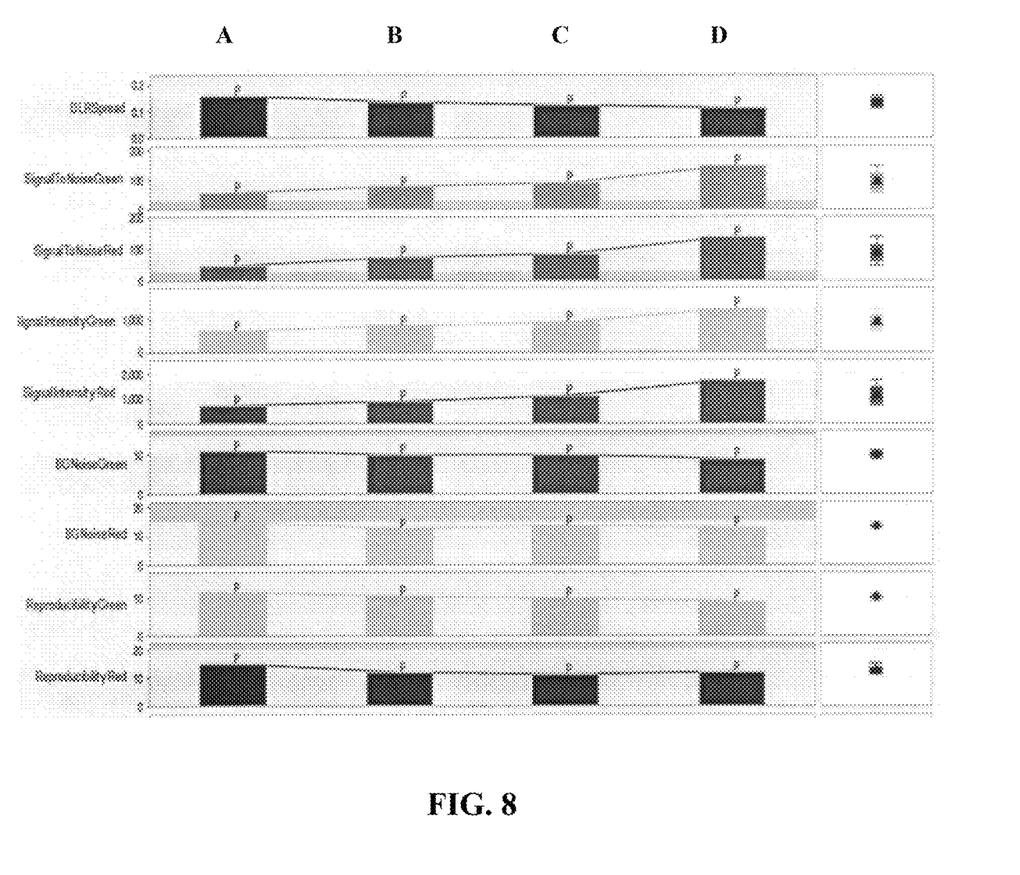
FIG. 8 columns A-D shows QC metrics plot obtained after hybridization on Agilent 4×180 CGH array, (column A) with 10 ng DNA input; (column B) with 25 ng DNA input; (column C) with 50 ng DNA input and (column D) with 1000 ng DNA input.

FIG. 8 shows QC metrics plot obtained after hybridization on Agilent 4×180 CGH array, (A) with 10 ng DNA input; (B) with 25 ng DNA input; (C) with 50 ng DNA input and (D) with 1000 ng DNA input.

Figure 9:
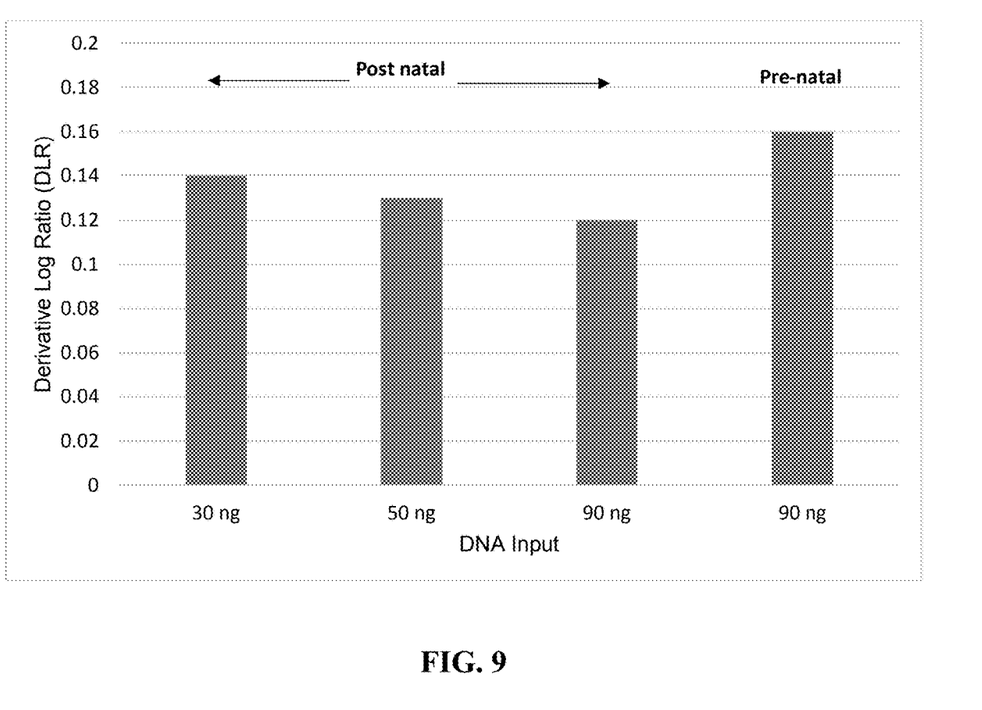
FIG. 9 shows low DLR scores obtained with DNA obtained from Postnatal and Prenatal samples at various inputs on a 4×180 CGH array.

FIG. 9 shows low DLR scores obtained with DNA obtained from Postnatal and Prenatal samples at various inputs on a 4×180 CGH array.

The following Examples 1-11 demonstrate labeling of genomic DNA to be used on 1-pack, 2-pack and 4-pack Agilent or equivalent microarrays.

Example 1 Labeling of Female Genomic DNA with Cyanine-3 dUTP

To an aqueous solution (19 µL) of 50 ng of female genomic DNA (Enzo Life Sciences, Inc. Cat #ENZ-GEN118-0100 or Promega, Cat #G1521), 20 µL of Primers/Reaction buffer was added. The combination was mixed by pipetting up and down and then incubated at 99° C. in a heat block for 20 min, and was then immediately cooled in an ice bath for 5 min. The mixture was then centrifuged and returned back to ice and then combined with 10 µL of nucleotide mixture (2 mM dATP, 2 mM dCTP, 2 mM dGTP, 1 mM dTTP and 0.8 mM Cyanine-3 dUTP) and 1 µL of Klenow. Upon mixing the combined mixture was incubated at 37° C. for 2 hours and then at 65° C. for 10 min. The labeled DNA was purified using PCR & Gel Clean-up kit (Enzo Life Sciences, Inc. Cat #ENZ-GEN100) following the manufacturer protocol and eluted with 50 µL of Elution buffer. A Nanodrop spectrophotometer in MicroArray mode (using 1.8 µL sample volume) was used to determine the total yield and pmols of dye incorporation. The results are shown in FIG. 2.

Example 2 Labeling of Female Genomic DNA with Cyanine-5 dUTP

Labeled DNA was prepared following the procedure in Example 1 using a nucleotide mixture of 2 mM dATP, 2 mM dCTP, 2 mM dGTP, 1 mM dTTP and 0.4 mM Cyanine-5 dUTP.

Example 3 Labeling of Prader-Willi DNA with Cyanine-3 dUTP

Labeled DNA was prepared following the procedure in Example 1 using 50 ng of Prader-Willi DNA (Coriell Cell Repositories, Cat #NA09024) and a nucleotide mixture of 2 mM dATP, 2 mM dCTP, 2 mM dGTP, 1 mM dTTP and 0.8 mM Cyanine-3 dUTP.

Example 4 Labeling of Prader-Willi DNA with Cyanine-5 dUTP

Labeled DNA was prepared following the procedure in Example 1 using 50 ng of Prader-Willi DNA (Coriell Cell Repositories, Cat #NA09024) and a nucleotide mixture of 2 mM dATP, 2 mM dCTP, 2 mM dGTP, 1 mM dTTP and 0.4 mM Cyanine-5 dUTP. Total yield and pmols of dye incorporation results are shown in FIG. 3.

Example 5 Labeling of Female Genomic DNA with Cyanine-3 dUTP Using Nucleotide Mix Containing EDTA Labeled DNA was prepared following the procedure in Example 1 using a nucleotide mixture of 2 mM dATP, 2 mM dCTP, 2 mM dGTP, 1 mM dTTP, 0.8 mM Cyanine-3 dUTP and 6 mM EDTA. Total yield and pmols of dye incorporation results are shown in FIG. 4.

Example 6 Labeling of Female Genomic DNA with Cyanine-5 dUTP Using Nucleotide Mix Containing EDTA Labeled DNA was prepared following the procedure in Example 1 using a nucleotide mixture of 2 mM dATP, 2 mM dCTP, 2 mM dGTP, 1 mM dTTP, 0.4 mM Cyanine-5 dUTP and 6 mM EDTA.

Example 7 Labeling of Prader-Willi DNA with Cyanine-3 dUTP Using Nucleotide Mix Containing EDTA Labeled DNA was prepared following the procedure in Example 1 using a nucleotide mixture of 2 mM dATP, 2 mM dCTP, 2 mM dGTP, 1 mM dTTP, 0.8 mM Cyanine-3 dUTP and 6 mM EDTA.

Example 7 Labeling of Prader-Willi DNA with Cyanine-5 dUTP Using Nucleotide Mix Containing EDTA Labeled DNA was prepared following the procedure in Example 1 using a nucleotide mixture of 2 mM dATP, 2 mM dCTP, 2 mM dGTP, 1 mM dTTP, 0.4 mM Cyanine-5 dUTP and 6 mM EDTA.

Example 8 Labeling of Female Genomic DNA with Cyanine-3 dUTP Using Nucleotide Mix Containing EDTA at Various Inputs Labeled DNA at various inputs (25 ng, 75 ng, 100 ng, 250 ng and 1000 ng) was prepared following the procedure in Example 1 using a nucleotide mixture of 2 mM dATP, 2 mM dCTP, 2 mM dGTP, 1 mM dTTP, 0.8 mM Cyanine-3 dUTP and 6 mM EDTA or 2 mM dATP, 2 mM dCTP, 2 mM dGTP, 1 mM dTTP and 0.8 mM Cyanine-3 dUTP. The volume of the input DNA remained 19 µL in all the reactions.

Example 9 Labeling of Female Genomic DNA with Cyanine-5 dUTP Using Nucleotide Mix Containing EDTA at Various Inputs Labeled DNA at various inputs (25 ng, 75 ng, 100 ng, 250 ng and 1000 ng) was prepared following the procedure in Example 1 using a nucleotide mixture of 2 mM dATP, 2 mM dCTP, 2 mM dGTP, 1 mM dTTP, 0.4 mM Cyanine-5 dUTP and 6 mM EDTA or 2 mM dATP, 2 mM dCTP, 2 mM dGTP, 1 mM dTTP and 0.4 mM Cyanine-5 dUTP. The volume of the input DNA remained 19 µL in all the reactions.

Example 10 Labeling of Prader-Willi DNA with Cyanine-3 dUTP Using Nucleotide Mix Containing EDTA at Various Inputs Labeled DNA at various inputs (25 ng, 75 ng, 100 ng, 250 ng and 1000 ng) was prepared following the procedure in Example 1 using a nucleotide mixture of 2 mM dATP, 2 mM dCTP, 2 mM dGTP, 1 mM dTTP, 0.8 mM Cyanine-3 dUTP and 6 mM EDTA or 2 mM dATP, 2 mM dCTP, 2 mM dGTP, 1 mM dTTP and 0.8 mM Cyanine-3 dUTP. The volume of the input DNA remained 19 µL in all the reactions.

Example 11 Labeling of Prader-Willi DNA with Cyanine-5 dUTP Using Nucleotide Mix Containing EDTA at Various Inputs Labeled DNA at various inputs (25 ng, 75 ng, 100 ng, 250 ng and 1000 ng) was prepared following the procedure in Example 1 using a nucleotide mixture of 2 mM dATP, 2 mM dCTP, 2 mM dGTP, 1 mM dTTP, 0.4 mM Cyanine-5 dUTP and 6 mM EDTA or 2 mM dATP, 2 mM dCTP, 2 mM dGTP, 1 mM dTTP and 0.4 mM Cyanine-5 dUTP. The volume of the input DNA remained 19 µL in all the reactions.

The following Examples 12-23 demonstrate labeling of genomic DNA for use with 8-pack Agilent or equivalent Microarray

Example 12 Labeling of Female Genomic DNA with Cyanine-3 dUTP

To an aqueous solution (9.5 µL) of 50 ng of female genomic DNA (Enzo Life Sciences, Inc. Cat #ENZ-GEN118-0100 or Promega, Cat #G1521), 10 µL of Primers/Reaction buffer was added. The combination was mixed by pipetting up and down and then incubated at 99° C. in a heat block for 20 min, and was then immediately cooled in an ice bath for 5 min. The mixture was then centrifuged and returned back to ice and then combined with 5 µL of nucleotide mixture (2 mM dATP, 2 mM dCTP, 2 mM dGTP, 1 mM dTTP and 0.8 mM Cyanine-3 dUTP) and 0.5 µL of Klenow. Upon mixing the combined mixture was incubated at 37° C. for 2 hours and then at 65° C. for 10 min. The labeled DNA was purified using PCR & Gel Clean-up kit (Enzo Life Sciences, Inc. Cat #ENZ-GEN100) following the manufacturer protocol and eluted with 30 µL of Elution buffer. A Nanodrop spectrophotometer in MicroArray mode (using 1.8 µL sample volume) was used to determine the total yield and pmols of dye incorporation.

Example 13 Labeling of Female Genomic DNA with Cyanine-5 dUTP

Labeled DNA was prepared following the procedure in Example 12 using a nucleotide mixture of 2 mM dATP, 2 mM dCTP, 2 mM dGTP, 1 mM dTTP and 0.4 mM Cyanine-5 dUTP.

Example 14 Labeling of Prader-Willi DNA with Cyanine-3 dUTP

Labeled DNA was prepared following the procedure in Example 12 using 50 ng of Prader-Willi DNA (Coriell Cell Repositories, Cat #NA09024) and a nucleotide mixture of 2 mM dATP, 2 mM dCTP, 2 mM dGTP, 1 mM dTTP and 0.8 mM Cyanine-3 dUTP.

Example 15 Labeling of Prader-Willi DNA with Cyanine-5 dUTP

Labeled DNA was prepared following the procedure in Example 12 using 50 ng of Prader-Willi DNA (Coriell Cell Repositories, Cat #NA09024) and a nucleotide mixture of 2 mM dATP, 2 mM dCTP, 2 mM dGTP, 1 mM dTTP and 0.4 mM Cyanine-5 dUTP. Total yield and pmols of dye incorporation results are shown in FIG. 3.

Example 16 Labeling of Female Genomic DNA with Cyanine-3 dUTP Using Nucleotide Mix Containing EDTA Labeled DNA was prepared following the procedure in Example 12 using a nucleotide mixture of 2 mM dATP, 2 mM dCTP, 2 mM dGTP, 1 mM dTTP, 0.8 mM Cyanine-3 dUTP and 6 mM EDTA. Total yield and pmols of dye incorporation results are shown in FIG. 4.

Example 17 Labeling of Female Genomic DNA with Cyanine-5 dUTP Using Nucleotide Mix Containing EDTA Labeled DNA was prepared following the procedure in Example 12 using a nucleotide mixture of 2 mM dATP, 2 mM dCTP, 2 mM dGTP, 1 mM dTTP, 0.4 mM Cyanine-5 dUTP and 6 mM EDTA.

Example 18 Labeling of Prader-Willi DNA with Cyanine-3 dUTP Using Nucleotide Mix Containing EDTA Labeled DNA was prepared following the procedure in Example 12 using a nucleotide mixture of 2 mM dATP, 2 mM dCTP, 2 mM dGTP, 1 mM dTTP, 0.8 mM Cyanine-3 dUTP and 6 mM EDTA.

Example 19 Labeling of Prader-Willi DNA with Cyanine-5 dUTP Using Nucleotide Mix Containing EDTA Labeled DNA was prepared following the procedure in Example 12 using a nucleotide mixture of 2 mM dATP, 2 mM dCTP, 2 mM dGTP, 1 mM dTTP, 0.4 mM Cyanine-5 dUTP and 6 mM EDTA.

Example 20 Labeling of Female Genomic DNA with Cyanine-3 dUTP Using Nucleotide Mix Containing EDTA at Various Inputs Labeled DNA at various inputs (25 ng, 75 ng, 100 ng, 250 ng and 1000 ng) was prepared following procedure in Example 12 using nucleotide mixture of 2 mM dATP, 2 mM dCTP, 2 mM dGTP, 1 mM dTTP, 0.8 mM Cyanine-3 dUTP and 6 mM EDTA or 2 mM dATP, 2 mM dCTP, 2 mM dGTP, 1 mM dTTP and 0.8 mM Cyanine-3 dUTP. The volume of the input DNA remained 9.5 µL in all the reactions.

Example 21 Labeling of Female Genomic DNA with Cyanine-5 dUTP Using Nucleotide Mix Containing EDTA at Various Inputs Labeled DNA at various inputs (25 ng, 75 ng, 100 ng, 250 ng and 1000 ng) was prepared following the procedure in Example 12 using a nucleotide mixture of 2 mM dATP, 2 mM dCTP, 2 mM dGTP, 1 mM dTTP, 0.4 mM Cyanine-5 dUTP and 6 mM EDTA or 2 mM dATP, 2 mM dCTP, 2 mM dGTP, 1 mM dTTP and 0.4 mM Cyanine-5 dUTP. The volume of the input DNA remained 9.5 µL in all the reactions.

Example 22 Labeling of Prader-Willi DNA with Cyanine-3 dUTP Using Nucleotide Mix Containing EDTA at Various Inputs Labeled DNA at various inputs (25 ng, 75 ng, 100 ng, 250 ng and 1000 ng) was prepared following the procedure in Example 12 using a nucleotide mixture of 2 mM dATP, 2 mM dCTP, 2 mM dGTP, 1 mM dTTP, 0.8 mM Cyanine-3 dUTP and 6 mM EDTA or 2 mM dATP, 2 mM dCTP, 2 mM dGTP, 1 mM dTTP and 0.8 mM Cyanine-3 dUTP. The volume of the input DNA remained 9.5 µL in all the reactions.

Example 23 Labeling of Prader-Willi DNA with Cyanine-5 dUTP Using Nucleotide Mix Containing EDTA at Various Inputs Labeled DNA at various inputs (25 ng, 75 ng, 100 ng, 250 ng and 1000 ng) was prepared following the procedure in Example 12 using a nucleotide mixture of 2 mM dATP, 2 mM dCTP, 2 mM dGTP, 1 mM dTTP, 0.4 mM Cyanine-5 dUTP and 6 mM EDTA or 2 mM dATP, 2 mM dCTP, 2 mM dGTP, 1 mM dTTP and 0.4 mM Cyanine-5 dUTP. The volume of the input DNA remained 9.5 µL in all the reactions.

Example 24 Preparing Labeled Genomic DNA for Hybridization on a 4-Pack Microarray Labeled genomic DNA (40 µL each) prepared as in Examples 1 and 4 was combined together in a 500 µL microfuge tube and this mixture was dried in a speedvac for about 60 min. The pellet so-obtained was dissolved in 39 µL of TE, pH 8.0 buffer and cooled in an ice bath for about 5 min. Separately a hybridization mix was prepared by combining 5 µL of Human Cot DNA (Enzo Life Sciences, Inc. Cat #ENZ-GEN116), 11 µL of 10×aCGH Blocking Agent and 55 µL of 2×HI-RPM Hybridization Buffer (Agilent Technologies, Cat #5188-5220). The hybridization mix (71 µL) was then combined with the labeled DNA solution (39 µL) and combined was mixed by pipetting up and down. This mixture was then heated on a heat block at 99° C. for 3 min and then at 37° C. for 30 min. It was then centrifuged and 100 µL of this mixture was loaded on to a 4-pack backing slide to which the array slide was then sandwiched on an assembled chamber per the manufacturer protocol (Agilent Oligonucleotide Array-Based CGH for Genomic DNA Analysis, Version 7.5, June 2016). The chamber was then placed into the over rotator rack and it was then hybridized at 67° C. for 24 hours. Following the manufacturer protocol, 1- and 2-pack microarray slides can be prepared using the same procedure.

Example 25 Washing and Scanning of 4-Pack Microarray Slide

After 24 hours of hybridization at 67° C., the sandwich of backing and array slides were separated carefully in Wash Buffer 1 and then the array slide was washed in fresh Wash buffer 1 for 5 min per the manufacturer protocol. The slide was then washed with Wash buffer 2 at 37° C. for 1 min and then air dried. The slide was then scanned on an Agilent scanner per protocol. The scanned image was then processed using Agilent CytoGenomics software to obtain DLRs. The results are shown in FIGS. 5, 7 and 8.

Example 26 Preparing Labeled Genomic DNA for Hybridization on a 8-Pack Microarray Labeled genomic DNA (24 μL each) prepared as in Example 12 and 15 was combined together in a 500 μL microfuge tube and this mixture was dried in a speedvac for about 60 min. The pellet so-obtained was dissolved in 16 μL of TE, pH 8.0 buffer and cooled in an ice bath for about 5 min. Separately a hybridization mix was prepared by combining 2 μL of Human Cot DNA (Enzo Life Sciences, Inc. Cat #ENZ-GEN116), 4.5 μL of 10xaCGH Blocking Agent and 22.5 μL of 2xHI-RPM Hybridization Buffer (Agilent Technologies, Cat #5188-5220). The hybridization mix (29 μL) was then combined with the labeled DNA solution (16 μL) and the combination was mixed by pipetting up and down. This mixture was then heated on a heat block at 99° C. for 3 min and then at 37° C. for 30 min. It was then centrifuged and 40 μL of this mixture was loaded on to an 8-pack backing slide to which the array slide was then sandwiched on an assembled chamber per the manufacturer protocol (Agilent Oligonucleotide Array-Based CGH for Genomic DNA Analysis, Version 7.5, June 2016). The chamber was then placed into the over rotator rack and it was then hybridized at 67° C. for 24 hours.

Example 27 Washing and Scanning of 8-Pack Microarray Slide

This procedure followed in this example was the same as that described in Example 25. The results are shown in FIG. 6.

Any and all publications, patents, patent applications and other documents cited in this application are hereby incorporated by reference in their entireties for all purposes to the same extent as if each individual publication, patent, patent application or other document were individually indicated to be incorporated by reference for all purposes.

It should be understood that wherever in this disclosure the term comprising or including (or a term of similar scope) is recited in connection with the description of any embodiment or part thereof, a corresponding embodiment or part thereof reciting instead the term consisting essentially of or the term consisting of (or a term of similar scope) is also disclosed.

While various specific embodiments have been illustrated and described, it will be appreciated that various changes can be made without departing from the spirit and scope of the invention(s). Moreover, features described in connection with one embodiment of the invention may be used in conjunction with other embodiments, even if not explicitly exemplified in combination within.

What is claimed is:

1. A method for preparing fluorescently labeled output DNA suitable for array-based comparative genomic hybridization from input genomic DNA, comprising the steps of:
   providing a sample of genomic DNA in an amount of 50+/−25% nanograms;
   admixing the sample of genomic DNA with random DNA primers in a reaction buffer comprising magnesium,
      wherein the admixture does not contain either of ethylenediaminetetraacetic acid (EDTA) and egtazic acid (EGTA);
   heating the admixture to denature the genomic DNA and then cooling the admixture to permit the random DNA primers to anneal to the genomic DNA in the admixture;
   further admixing to form a primer extension composition comprising
      a Klenow fragment DNA-dependent DNA polymerase,
      0.4 mM+20% dATP,
      0.4 mM+20% dCTP,
      0.4 mM+20% dGTP,
      0.4 mM+20% dTTP,
      0.08 mM+20% to 0.16 mM+20% fluorescently labeled dUTP,
      wherein the primer extension composition formed does not contain either of ethylenediaminetetraacetic acid (EDTA) and egtazic acid (EGTA); and
   incubating the primer extension composition at a temperature permissive for primer extension by the polymerase to extend the random DNA primers on the genomic DNA, thereby forming fluorescently labeled DNA extension products.

2. The method of claim 1, wherein the fluorescently labeled dUTP is Cyanine-3 dUTP and its concentration in the primer extension composition is 0.16 mM+20%.

3. The method of claim 1, wherein the fluorescently labeled dUTP is Cyanine-5 dUTP and its concentration in the primer extension composition is 0.08 mM+20%.

4. The method of claim 1, further comprising the steps of stopping the primer extension; and
   purifying the DNA present to obtain purified DNA comprising the fluorescently labeled DNA extension products.

5. The method of claim 4, further comprising the step of:
   hybridizing the purified DNA comprising the fluorescently labeled DNA extension products to a comparative genomic hybridization (CGH) array.

6. A method for preparing fluorescently labeled output DNA suitable for array-based comparative genomic hybridization from input genomic DNA, comprising the steps of:
   providing a sample of genomic DNA in an amount of 50+/−25% nanograms;
   admixing the sample of genomic DNA with random DNA primers in a reaction buffer comprising magnesium,
      wherein the admixture does not contain either of ethylenediaminetetraacetic acid (EDTA) and egtazic acid EGTA;
   heating the admixture to denature the genomic DNA and then cooling the admixture to permit the random DNA primers to anneal to the genomic DNA in the admixture;
   further admixing to form a primer extension composition comprising
      a Klenow fragment DNA-dependent DNA polymerase,
      0.4 mM±20% dATP,
      0.4 mM±20% dCTP,
      0.4 mM±20% dGTP,
      0.2 mM±20% to 0.3 mM±20% dTTP, and
      0.1 mM±20% to 0.2 mM±20% fluorescently labeled dUTP,
      wherein the primer extension composition formed does not comprise a metal chelating agent; and
   incubating the primer extension composition at a temperature permissive for primer extension by the polymerase to extend the random DNA primers on the genomic DNA, thereby forming fluorescently labeled DNA extension products.

7. The method of claim 6, wherein the concentrations of labeled and unlabeled dNTPs in the primer extension composition are:
- 0.4 mM±20% dATP;
- 0.4 mM±20% dCTP;
- 0.4 mM±20% dGTP;
- 0.25 mM±20% dTTP; and
- 0.2 mM±20% Cyanine-3 dUTP.

8. The method of claim 6, wherein the concentrations of labeled and unlabeled dNTPs in the primer extension composition are:
- 0.4 mM±20% dATP;
- 0.4 mM±20% dCTP;
- 0.4 mM±20% dGTP;
- 0.25 mM±20% dTTP; and
- 0.2 mM±20% Cyanine-5 dUTP.

9. The method of claim 1, wherein the random DNA primers comprise random DNA octomers.

10. The method of claim 6, wherein the random DNA primers consist essentially of random DNA octomers.

11. The method of claim 6, further comprising the steps of:
- stopping the primer extension; and
- purifying the DNA present to obtain purified DNA comprising the fluorescently labeled DNA extension products.

12. The method of claim 11, further comprising the step of:
- hybridizing the purified DNA comprising the fluorescently labeled DNA extension products to a comparative genomic hybridization (CGH) array.

* * * * *